(12) United States Patent
Qiang et al.

(10) Patent No.: US 10,782,429 B2
(45) Date of Patent: Sep. 22, 2020

(54) METHOD AND APPARATUS TO USE A SINGLE ENERGY SOURCE TO DETERMINE ENERGY CORRECTION FOR A GAMMA DETECTOR

(71) Applicant: CANON MEDICAL SYSTEMS CORPORATION, Otawara-shi (JP)

(72) Inventors: Yi Qiang, Vernon Hills, IL (US); Xiaoli Li, Vernon Hills, IL (US); Kent C. Burr, Vernon Hills, IL (US)

(73) Assignee: CANON MEDICAL SYSTEMS CORPORATION, Otawara-shi (JP)

( * ) Notice: Subject to any disclaimer, the term of this patent is extended or adjusted under 35 U.S.C. 154(b) by 0 days.

(21) Appl. No.: 16/269,380

(22) Filed: Feb. 6, 2019

(65) Prior Publication Data

US 2020/0249369 A1    Aug. 6, 2020

(51) Int. Cl.
*G01T 7/00* (2006.01)
*G01T 1/29* (2006.01)

(52) U.S. Cl.
CPC .......... *G01T 7/005* (2013.01); *G01T 1/2985* (2013.01)

(58) Field of Classification Search
CPC ......... G01T 7/00; G01T 1/2985; G01T 7/005; G01T 1/249; G01T 1/29
See application file for complete search history.

(56) References Cited

U.S. PATENT DOCUMENTS

| | | | |
|---|---|---|---|
| 9,927,539 B2 | 3/2018 | Shahar et al. | |
| 10,054,697 B1 * | 8/2018 | Vencelj | G01T 1/2018 |
| 2003/0209662 A1 | 11/2003 | Nelson et al. | |
| 2007/0235657 A1 | 10/2007 | He et al. | |
| 2011/0082659 A1 * | 4/2011 | Montemont | G01T 7/005 702/85 |
| 2015/0160353 A1 * | 6/2015 | Wang | G01T 1/249 702/86 |

OTHER PUBLICATIONS

Chad Jacob Bircher, "Design, Calibration, and Evaluation of Depth-of-Interaction-Capable PET Detector Modules", A Dissertation Presented to the Faculty of the University of Texas Health Science Center at Houston and The University of Texas M.D. Anderson Cancer Center Graduate School of Biomedical Sciences, Dec. 2012.

* cited by examiner

*Primary Examiner* — David P Porta
*Assistant Examiner* — Fani Boosalis
(74) *Attorney, Agent, or Firm* — Oblon, McClelland, Maier & Neustadt, L.L.P.

(57) ABSTRACT

A method and apparatus are provided for positron emission imaging to calibrate energy measurements of a pixilated gamma-ray detector using energy sharing events between channels of the detector. Due to conservation of energy, when the energy of a single gamma ray shared among multiple channels, the sum of measured energies across the respective channel must equal the original energy of the incident gamma ray. Further, the fractions of the original energy distributed to the respective channels can span the entire range of zero to the original energy. Thus, a single gamma-ray source (e.g., cesium isotope 137) can be used to continuously calibrate the nonlinear energy response of the detector over an entire range of interest.

20 Claims, 10 Drawing Sheets

METHOD AND APPARATUS TO USE A SINGLE ENERGY SOURCE TO DETERMINE ENERGY CORRECTION FOR A GAMMA DETECTOR

FIELD

This disclosure relates to energy detection in a gamma-ray detector, and, more particularly, to calibrating energy corrections of the gamma-ray detector using a single, energy source.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In positron emission tomography (PET) imaging, a tracer agent is introduced into the patient, and the physical and bio-molecular properties of the agent cause it to concentrate at specific locations in the patient's body. The tracer emits positrons, resulting in an annihilation event occurs when the positron collides with an electron that produces two gamma rays (at 511 keV) traveling at substantially 180 degrees apart.

PET imaging systems use detectors positioned around the patient to detect coincidence pairs of gamma rays. A ring of detectors can be used in order to detect gamma rays coming from each angle. Thus, a PET scanner can be substantially cylindrical to be maximize the capture of the isotropic radiation. A PET scanner can be composed of several thousand individual crystals (e.g., Lutetium Orthosilicate (LYSO) or other scintillating crystal) which are arranged in two-dimensional scintillator arrays that are packaged in modules with photodetectors to measure the light pulses from respective scintillation events. For example, the light from respective elements of a scintillator crystal array can be shared among multiple photomultiplier tubes (PMTs) or can be detected by silicon photomultipliers (SiPMs) having a one-to-one correspondence with the elements of a scintillator crystal array. To reconstruct the spatio-temporal distribution of the tracer via tomographic reconstruction principles, each detected event is characterized for its energy (i.e., amount of light generated), its location, and its timing. By detecting the two gamma rays, and drawing a line between their locations, i.e., the line-of-response (LOR), one can determine the likely location of the original disintegration. The timing information can also be used to determine a statistical distribution for the annihilation along the LOR based on time-of-flight (TOF) information of the two gamma rays. By accumulating a large number of LORs, tomographic reconstruction can be performed to determine a volumetric image of the spatial distribution of radioactivity (e.g., tracer density) within the patient.

Single-photon emission computed tomography (SPECT) is similar to PET except a collimator is used to restrict the solid angle of gamma rays incident on the respective detector elements (e.g., the respective elements in the scintillator crystal array), making reconstruction possible using single gamma-ray detection events as opposed to requiring coincidences to determine a LOR.

In addition to position information (e.g., the LOR) and timing information (e.g., the TOF), detectors in PET and SPECT systems can also acquire and use energy information in the image reconstruction process. However, energy measurements can deviate from an ideal linear response due to non-linearities in the measurement process and/or practical considerations related to, e.g., light/charge sharing among channels during a multi-channel gamma-ray detection (e.g., due to the gamma-ray energy being absorbed in multiple detectors/channels as can happen due to Compton scattering). Accordingly, improved techniques are desired to correct energy measurements in pixelated gamma-ray detectors.

Certain implementations of both PET and SPECT imaging (e.g., time-of-flight PET) can depend on the ability to determine the position, time, and energy of detected gamma rays. For example, time and energy windowing can be used to distinguish scattered and random gamma rays from coincident gamma rays originating from the same positron annihilation event. Thus, the reliability of the coincidence discrimination can depend on the accuracy of the timing and energy calibrations.

On the one hand it is desirable to provide improved energy calibrations for gamma-ray detectors. On the other hand, there is a tradeoff with making the energy calibration too cumbersome and time consuming. To address this tradeoff, improved energy calibration methods are desired that provide good accuracy without being too costly or cumbersome. Accordingly, the energy-calibration methods described herein provide efficient techniques to calibrate gamma-ray detectors over a wide range of energies using a single-energy gamma-ray source.

BRIEF DESCRIPTION OF THE DRAWINGS

A more complete understanding of this disclosure is provided by reference to the following detailed description when considered in connection with the accompanying drawings, wherein.

DETAILED DESCRIPTION

Figure 1:
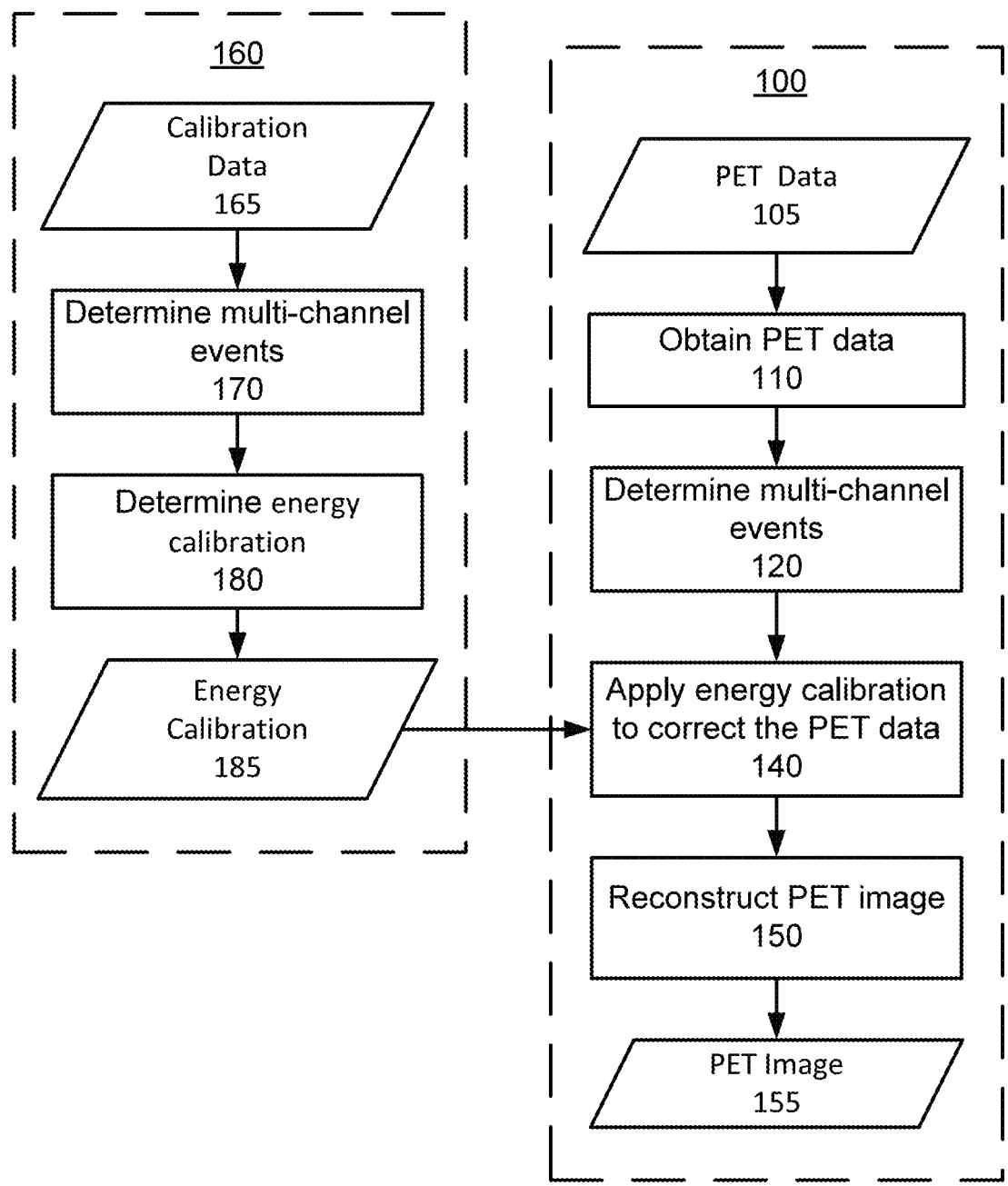
FIG. 1 shows examples of flow diagrams for a combination of a method 160 to generate energy calibrations and a method 100 using the energy calibrations to correct energy measurements, according to one implementation.

As discussed above, the accuracy of image reconstruction using positron emission tomography (PET) or single-photon emission computed tomography (SPECT) can depend on the resolution and accuracy with respect to energy and timing with which gamma rays are detected. And the energy and timing accuracy of the detection depend on the energy and timing calibrations of the gamma-ray detectors. The methods described herein provide an improved method for energy calibration of gamma-ray detectors.

To achieve best results, a gamma detector's energy response should be properly calibrated in order to accurately map the detected signal strength to an energy value for the incident gamma ray. Accurate energy measurements with good resolution can yield improved results for many applications, such as PET and SPECT.

When a detector's sensitivity element is a crystal array, inter crystal scattering, light sharing, and charge sharing can result in the energy of the incident gamma ray being shared between multiple crystals/readout channels. That is, each of the channels that share the energy detects a fraction of the total energy of the gamma ray. Therefore, to cover the entire range over which energy values can be measure, the energy calibration of the gamma-ray detector should span a range extending from the energy of a positron emission gamma ray (i.e., 511 keV) to lower energies (e.g., the calibration range of the detector can extend down to minimum detection threshold below which signals are treated as being noise and ignored). Calibrating over such an extended range of interest enables accurate representation of the energy values detected during multi-channel detection, which results from the above-noted charge sharing mechanisms (e.g., Compton scattering).

In general, the energy response of a gamma-ray detector will exhibit some degree of non-linearity. One method to calibrate a detector's energy response over a broad range of energies is to use multiple sources with different energies. For example, external gamma-ray sources or radiation background from the crystal can be used to provide gamma rays with different energies.

In contrast to multi-detector methods, the methods described herein use a single gamma-ray source, producing gamma rays having energies equal to or greater than the gamma-ray energy emitted during PET imaging (e.g., 511 keV). Then multi-channel events in which the energy of a gamma ray is distributed over several detector channels (each channel detects only a fraction of the total gamma-ray energy) are used to calibrate the detectors for energies less than the PET-imaging gamma-ray energy (e.g., 511 keV). This energy calibration method has several advantages over the multiple gamma-ray source energy calibration methods in which multi-channel detection events are omitted from the calibration process. For example, multiple-source energy calibration suffer from the following issues or difficulties: (i) higher cost calibration due to requiring multiple sources rather than a single source; (ii) a longer time is required to perform calibrations; (iii) maintaining a consistent testing environment while changing among all of the multiple sources; and (iv) only discrete, rather than continuous, energy coverage is provided. The single-source energy calibration methods described herein address/overcome these deficiencies.

The single-source energy calibration method can, for example, use multi-channel detection events with energy sharing from a single-energy gamma source to perform and maintain an energy calibration. The causes of the energy sharing can include, but is not limited to, inter-crystal scattering, light sharing between crystals and/or photosensors, and charge sharing between readout channels. In certain implementations, an initial/factory calibration of the energy can be performed initially using multiple gamma sources, and then maintenance of the energy calibration can be performed using a single-source energy calibration method.

In certain implementations, the single-energy gamma source can include a single radioactive isotope (i.e., no more than one isotope emitting gamma rays), and the single radioactive isotope can emit gamma rays predominantly at a single gamma-ray energy (i.e., more than 50% of the gamma rays emitted by the single radioactive isotope are at an emission line of the single gamma-ray energy). For example, the single radioactive isotope can be cesium isotope 137, and the single gamma-ray energy can be 662 keV. Other possibilities for the single radioactive isotope and the single gamma-ray energy are discussed below.

As discussed above, the detector response/output as a function of the input energy (i.e., the actual energy of the incident/primary gamma ray) can deviate from an ideal linear response due to various practical considerations. For example, non-linearities can arise in the measurement process as a result of using the time-over-threshold as a surrogate quantity to represent the energy. Accordingly, the methods and apparatus described apply improved approaches and techniques to correct energy measurements to generate corrected energy values that are substantially linear.

Most commercial positron emission tomography (PET) systems use arrays of scintillator crystals to detect gamma rays having energies of 511 keV that are generated by positron-electron annihilation. These PET systems can provide both energy and position information. Sometimes the energy of a gamma ray can be shared by two crystals due to inter-crystal scattering (e.g., Compton scattering). When the energy from a single gamma ray is detected at more than one crystal/channel, the detection event can be referred to as "multi-channel detection." The total energy of a scattering event can be recovered by adding individual energies from all involved crystals (the respective crystals and their corresponding photodetectors, amplifiers and electronics can also be referred to as "channels"). The summing can be realized either through analogue or digital methods depending on the choice of readout and electronics.

The energy deposited in a crystal can be converted to an electrical signal, and the electrical signal can then be digitized. This digitization process can be performed by various methods. Among the methods for digitizing the energy measurements of gamma rays, the time-over-threshold (TOT) method has the advantages of being very cost effective and can be easily applied to applications requiring high channel density. Although the TOT value is a monotonically increasing function of the absorbed energy in a given channel, the relation between the TOT and the actual energy can deviate from being perfectly linear. This nonlinear detector response and/or other nonlinear detector responses can be corrected using the methods described herein.

As used herein, the term "energy" is not restricted to mean a calibrated energy that is linearly related to the actual or true energy. In general, the term "energy", as used herein, specifies an energy coordinate that represents and is related monotonically to the actual or true energy. Thus, the term "energy" does not necessarily refer to actual or true energy, unless context clearly indicates otherwise.

For example, when the summing of energies is discussed herein, this summing can be performed on "energy coordinates," rather than a calibrated value that is linearly related to the actual energy. The relation of the measured/raw energy $E_{raw}$ (i.e., "energy coordinates") can be related to the true energy $E_{true}$ by a nonlinear function $E_{true}=f(E_{raw})$ and the inverse function can be applied to map from the true energy to the measured, raw energy value according to $E_{raw}=f^{-1}(E_{true})$. Because the relation between measured, raw energy to the true energy is nonlinear, the sum of two measured energies $f^{-1}(E_1)$ and $f^{-1}(E_2)$ from two-channel detection does not equal the measured/raw energy for an equivalent single-channel detection, i.e., $f^{-1}(E_1)+f^{-1}(E_2) \neq f^{-1}(E_1+E_2)$, wherein $E_1+E_2=E_{Total}$, and $E_{Total}$ is the true energy of the incident, e.g., 511 keV. Accordingly, to accurately compare the energies of multi-channel detections with signal-channel detections, an energy calibration and correction is applied to the summed energies of the multi-channel detections.

Figure 2A:
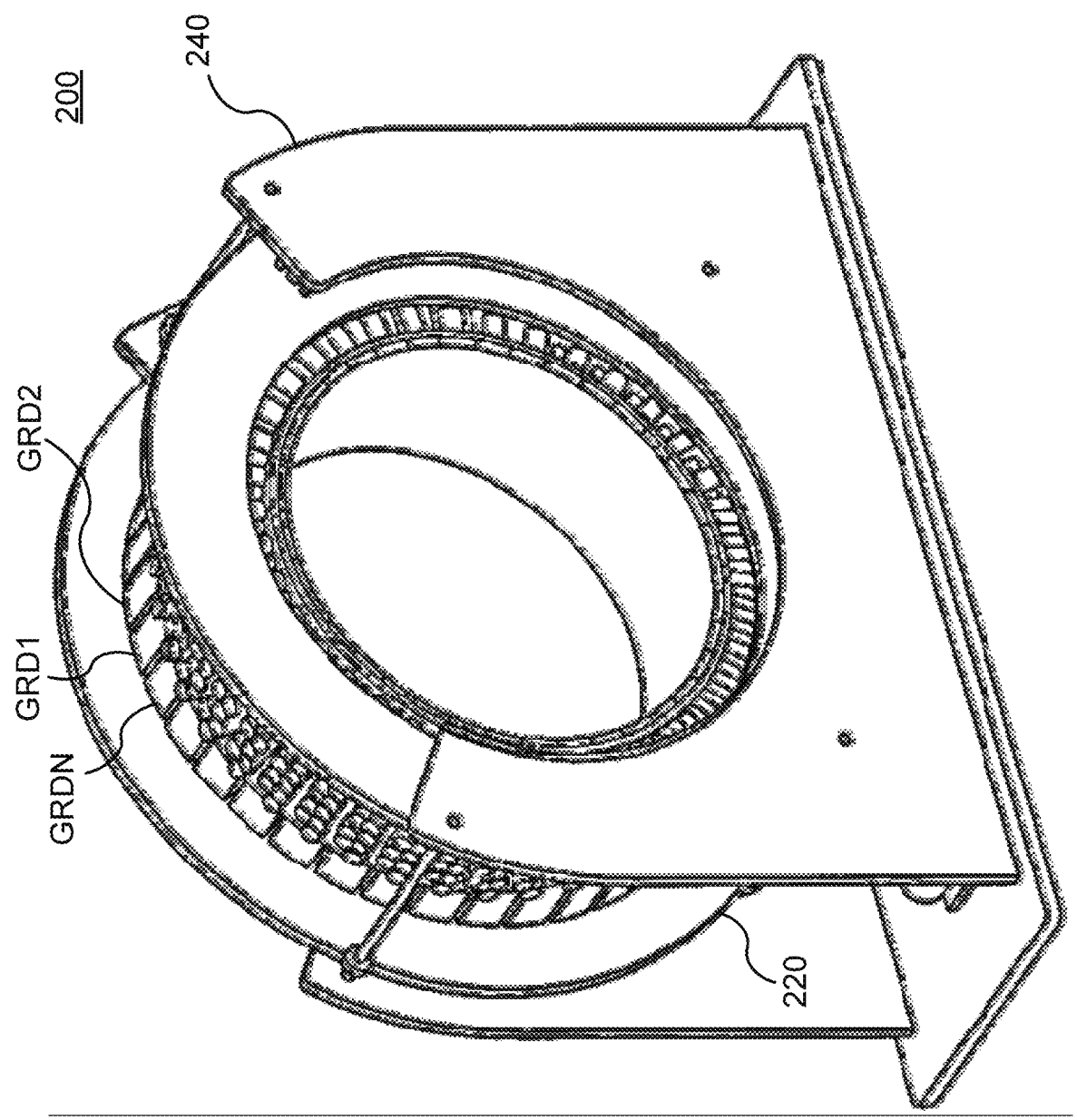
FIG. 2A shows a perspective view of a positron-emission tomography (PET) scanner, according to one implementation.
Figure 2B:
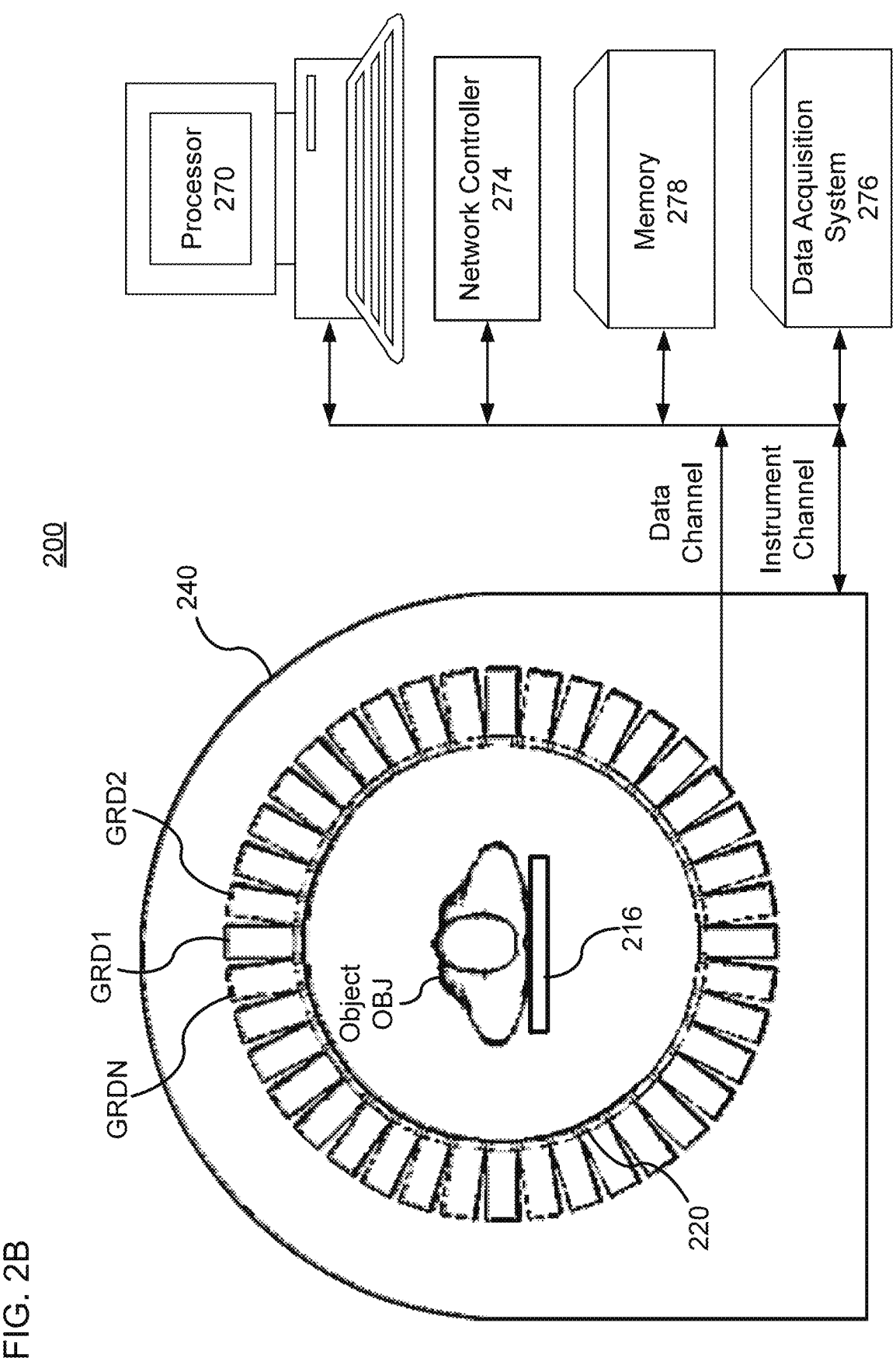
FIG. 2B shows a schematic view of the PET scanner, according to one implementation.

Referring now to the drawings, wherein like reference numerals designate identical or corresponding parts throughout the several views, FIG. 1 shows a non-limiting example of a flow diagram of a method 100 for correcting energy measurements in PET data 105, and shows a non-limiting example of a flow diagram of a method 160 for determining an energy calibration to be used in method 100 to correct the energy measurements in the PET data 105. Further, FIGS. 2A and 2B show a non-limiting example of a PET scanner that can be used to perform the methods 100 and 160.

Method 160 generates the energy calibration 185 from calibration data. Method 100 performs an energy calibration on PET data 105 using the energy calibration 185 to account for multi-channel events to correct the PET data 105, and then reconstructs a PET image 155 from the calibrated emission data.

At step 110, the PET data 105 is obtained and pre-processed. For example, the PET scanner 200 can obtain emission data 105 representing energies, times, and positions corresponding to gamma ray detection events. For example, the detection events can correspond to coincidence pairs from respective positron emissions occurring in an object OBJ. The detection events can be detected at a plurality of detector elements. For example, the detector elements and be arranged in two-dimensional (2D) arrays referred to as detector modules, and the detector modules can be arranged in an annular shape to encircle an object OBJ to be imaged, as shown in FIGS. 2A and 2B. When multi-channel detection occurs, the energy from a single gamma ray is distributed and detected among two or more detector elements. These two or more detector elements can be within a single detector module (e.g., adjacent detector elements), or can be distributed among two or more detector modules. For example, in Compton scattering, the scattered gamma ray can traverse several detector elements before being absorbed in a second detector element far from the first detector element at which Compton scattering occurred.

At step 120, the processing circuitry is configured to select from the emission data 105 multi-channel detection events, and then group them by event. That is, each group corresponds a single primary gamma ray. For first-order scatter, each group will include two hits: the first hit being the energy detected in the first crystal at which Compton scattering occurred, and the second hit being the energy detected in the second crystal at which the scattered gamma ray is absorbed). Similarly, each group for a second-order scatter event will include three hits (i.e., one for the primary gamma ray and two for each of the two scatter gamma rays), and so forth (e.g., four hits in groups corresponding to third-order scatter, etc.).

Multi-channel events can be selected, e.g., based on the detection signals' proximity in time, based on the detection signals' proximity in space, based on the sum of the energies of the signals, or based any combination thereof. For example, if the gamma-ray source has a known energy (e.g., 511 keV for gamma rays from positron annihilation), then the more closely the signals sum to the known energy the more likely the signals correspond to a same multi-channel event. Further, signals occurring closer together in time are more likely to correspond to a same multi-channel event, and signals occurring closer together in space are more likely to correspond to a same multi-channel event. Moreover, when all three of the above conditions (i.e., energy, time, and space) are all satisfied, then the signals are even more likely to correspond to a same multi-channel event. Thus, the processing to group signals into multi-channel events can be performed using a multivariate statistical analysis.

At step 140, the energy calibrations 185 are applied to the PET data to generate corrected PET data.

At step 150, a PET image 155 is reconstructed from the correct PET data using any known reconstruction method. For example, the PET data 105 can be used to reconstruct an image of radioactivity level (e.g., tracer density) as a function of voxel position. The image reconstruction can be performed using a back-projection method, a filtered back-projection method, a Fourier-transform-based image reconstruction method, an iterative image reconstruction method, a matrix-inversion image reconstruction method, a statistical image reconstruction method, a list-mode method, or other reconstruction method or combination thereof, as would be understood as a person of ordinary skill in the art. For example, the initial PET image can be reconstructed using an ordered subset expectation maximization (OS-EM) algorithm that is initialized with an FBP reconstructed PET image.

Method 160 generates the energy calibration 185 from calibration data 165. The calibration data 165 can be gamma ray measurements generated by the detector elements of the PET system 200. The calibration data 165 can be generated using a single calibration source of gamma rays.

For example, the calibration data 165 can be generated using a calibration source having one or more pieces of cesium isotope 137 (Cs-137), having a half-life of approximately 30 years and producing gamma rays with energies of 662 keV. These pieces of Cs-137 can be arranged to create an approximately uniform flux density of gamma rays within the beam. In certain implementations, the beam can be a cone beam or can isotopically radiate into all $4\pi$ steradians. The gamma rays with energies of 662 keV produced by the Cs-137 are higher than the 511 keV gamma rays produced by positron-emission radiation sources. Instead of multiple pieces, a substantially uniform distributed source could be used (commonly known as a "flood source"). Other gamma ray sources that can be used include, e.g., (i) cobalt isotope 60 (Co-60 with a half-life of 5.3 years and gamma-ray energies of 1.17 MeV and 1.33 MeV);

(ii) germanium isotope 68 (Ge-68 with a half-life of 0.74 years and gamma-ray energy of 511 keV);

(iii) sodium isotope 22 (Na-22 with a half-life of 2.6 years and gamma-ray energies of 511 keV and 1.275 MeV); and (iv) iridium isotope 192 (Ir-192 with a half-life of 74.3 days and gamma-ray energies in the range of 0.21 MeV to 0.61 MeV).

When the energy of the gamma rays produced by a given source are greater than or equal to 511 keV (i.e., the energy generated by positron emission), the fractions of shared energies in multi-channel events can continuously range from the energy of the primary gamma ray (e.g., 662 keV for Cs-137) down to 0 keV. Thus, a single source can be used to calibrate the entire desired range of energies for multi-channel detection. That is, a single gamma-ray source generating gamma rays with energy of at least 511 keV can be used the calibrate the entire range of interest.

At step 170, the calibration data 165 is sorted into multi-channel events and single-channel events. This sorting and filtering of the multi-channel events from the total set of the calibration data 165 can be performed using methods similar to those described in step 120 of method 100.

Figure 3:
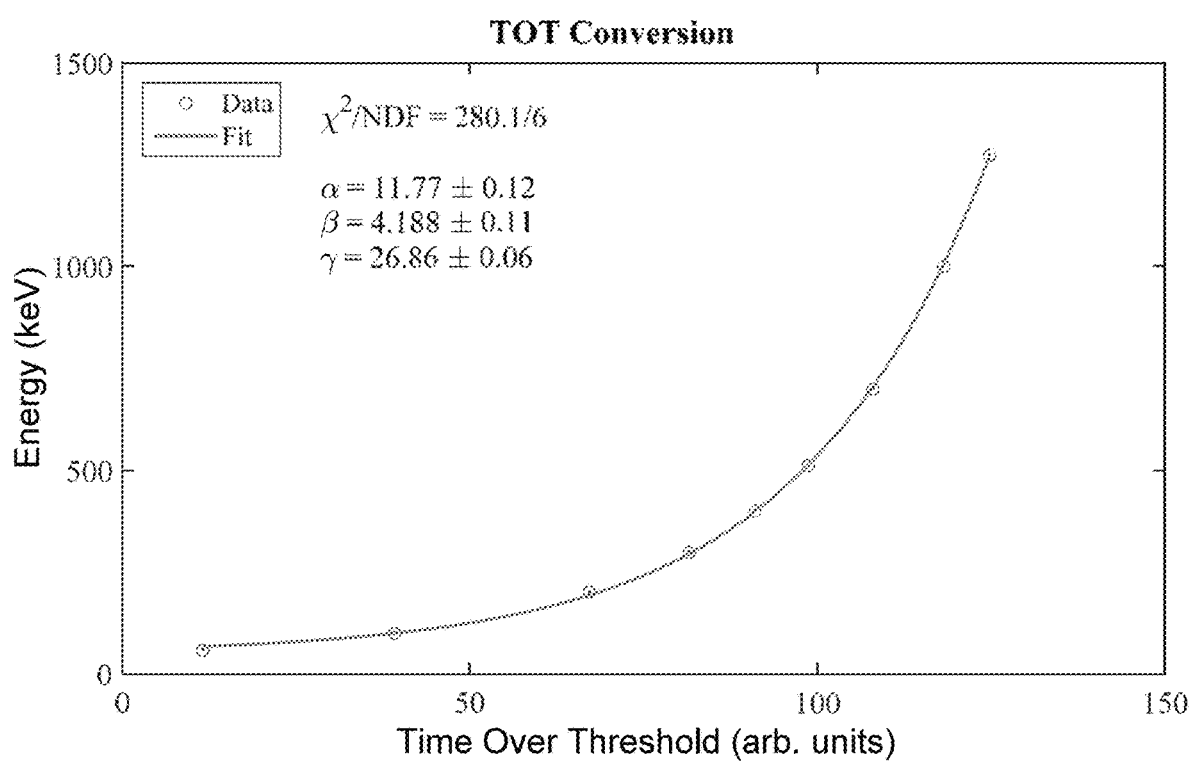
FIG. 3 shows a plot of a time-over-threshold (TOT) measurement versus input energy of gamma rays, according to one implementation.

At step 180, the calibration data 165 is used to generate the energy calibration 185. FIG. 3 shows a non-limiting example of a parameterized curve of the nonlinear detector response with respect to energy. As shown, the nonlinear detector response can be parameterized by assuming a functional form defined by a few parameters (e.g., the variables α, β, and γ), and then curve fitting the data to find the values of the parameters that best match the data according to some curve-fitting criteria (e.g., minimizing the mean square error between the functional form and the calibration data). Accordingly, the nonlinear response of a detector to input energy can be parameterized. The parameterization can be improved by using data that includes multiple points along the energy axis. Generally, the shape of the nonlinear response will be similar between different detector elements/channels, but the best-fit parameters can vary somewhat among the different detector elements/channels within a given scanner. Accordingly, the parameters can be calibrated for each readout channel/module with the same functional form being used for all channels in the scanner. FIG. 3 shows an energy calibration directed to correcting for the nonlinearity in the Time-over-Threshold (TOT) technique. That is, the parameterization of the energy response is for a PET detector using TOT technique. In this case, the functional form selected to fit the data is $$E = f(x, \vec{p}) = \alpha(\beta + e^{x/\gamma}),$$

wherein x is the amplitude of the measured signal representing the energy (e.g., the TOT value) and $\vec{p} = \{\alpha, \beta, \gamma\}$ are the parameters of the functional form, which are to be adjusted in order to obtain the best fit. Other functional forms can also be used without deviating from the spirit of the invention, as would be understood by a person of ordinary skill in the art.

For example, as an alternative to a functional-form parameterization, the parametrization can be expressed using parameters in a Look-Up-Table (LUT). In one implementation, e.g., a LUT can relate discrete points for the mapping $E_i = f(x_i)$, and interpolation can be used to determine the mapping for points in between the discrete points.

Accordingly, in certain implementations, rather than using a functional form, the non-linearity correction can be specified by a LUT, in which the LUT specifies correction factors corresponding to specific signal levels. Correction factors for signal levels which do not appear in the LUT can be determined by interpolation or extrapolation from values which do appear in the LUT. Different methods of interpolation (e.g. spline, linear, or cubic) can be used depending on accuracy and computational complexity constraints. Similarly, the number of signal levels in the LUT can depend on the accuracy and computational complexity constraints. Generally, a larger number of values will result in improved energy resolution (i.e., accuracy of correction). For the case of a LUT approach, every correction factor in the LUT can be a respective parameter that is determined by the energy calibration.

The energy calibration 185 can include TOT nonlinearity corrections. Additionally, the energy calibration 185 can account for nonlinearities due to charge sharing, thresholding, and other nonlinear effects. For example, the energy calibration 185 can be a lookup table indexed by the positions/identities (IDs) of respective detector elements to obtain parameters of an equation expressing a non-linear correction. Accordingly, the parameterization of the energy calibration can be performed on a detector element by detector element basis.

Now a description of the PET apparatus and signal sharing between channels is provided, after which, a more detailed description of the energy calibration is provided.

FIGS. 2A and 2B show a non-limiting example of a PET system 200 that is configured with detector modules (i.e., gamma-ray detectors (GRD)) arranged in an annular shape. Each of the detector modules can include several arrays of detector elements. The GRDs include scintillator crystal arrays for converting the gamma rays into scintillation photons (e.g., at optical, infrared, and ultraviolet wavelengths), which are detected by photodetectors. In the non-limiting example illustrated in FIGS. 2A and 2B, the photodetectors are photomultiplier tubes (PMTs) that are much bigger than the respective scintillator crystal elements. In one preferred embodiment, the photodetectors are silicon photomultipliers (SiPMs) that can have a detection cross-section that approximates the cross-sectional area of the individual scintillator crystal elements, creating a one-to-one correspondence between the crystals and the photodetectors. If the photodetectors are larger than the crystals, such that a single photodetector is used to detect the optical signals from multiple crystals, then Anger arithmetic can be used to determine the positions. However, Anger arithmetic is not necessarily required when there is a one-to-one correspondence between the crystals and the photodetectors.

FIGS. 2A and 2B show a non-limiting example of a PET scanner 200 that can implement the methods 100 and 160. The PET scanner 200 includes a number of gamma-ray detectors (GRDs) (e.g., GRD1, GRD2, through GRDN) that are each configured as rectangular detector modules. According to one implementation, the detector ring includes 40 GRDs. In another implementation, there are 48 GRDs, and the higher number of GRDs is used to create a larger bore size for the PET scanner 200.

Each GRD can include a two-dimensional array of individual detector crystals, which absorb gamma radiation and emit scintillation photons. The scintillation photons can be detected by a two-dimensional array of photomultiplier tubes (PMTs) that are also arranged in the GRD. A light guide can be disposed between the array of detector crystals and the PMTs.

Alternatively, the scintillation photons can be detected by an array a silicon photomultipliers (SiPMs), and each individual detector crystals can have a respective SiPM.

Each photodetector (e.g., PMT or SiPM) can produce an analog signal that indicates when scintillation events occur, and an energy of the gamma ray producing the detection event. Moreover, the photons emitted from one detector crystal can be detected by more than one photodetector, and, based on the analog signal produced at each photodetector, the detector crystal corresponding to the detection event can be determined using Anger logic and crystal decoding, for example.

FIG. 2B shows a schematic view of a PET scanner system having gamma-ray (gamma-ray) photon counting detectors (GRDs) arranged to detect gamma-rays emitted from an object OBJ. The GRDs can measure the timing, position, and energy corresponding to each gamma-ray detection. In one implementation, the gamma-ray detectors are arranged in a ring, as shown in FIGS. 2A and 2B. The detector crystals can be scintillator crystals, which have individual scintillator elements arranged in a two-dimensional array and the scintillator elements can be any known scintillating material. The PMTs can be arranged such that light from each scintillator element is detected by multiple PMTs to enable Anger arithmetic and crystal decoding of scintillation event.

FIG. 2B shows an example of the arrangement of the PET scanner 200, in which the object OBJ to be imaged rests on a table 216 and the GRD modules GRD1 through GRDN are arranged circumferentially around the object OBJ and the table 216. The GRDs can be fixedly connected to a circular component 220 that is fixedly connected to the gantry 240. The gantry 240 houses many parts of the PET imager. The gantry 240 of the PET imager also includes an open aperture through which the object OBJ and the table 216 can pass, and gamma-rays emitted in opposite directions from the object OBJ due to an annihilation event can be detected by the GRDs and timing and energy information can be used to determine coincidences for gamma-ray pairs.

In FIG. 2B, circuitry and hardware is also shown for acquiring, storing, processing, and distributing gamma-ray detection data. The circuitry and hardware include: a processor 270, a network controller 274, a memory 278, and a data acquisition system (DAS) 276. The PET imager also includes a data channel that routes detection measurement results from the GRDs to the DAS 276, a processor 270, a memory 278, and a network controller 274. The data acquisition system 276 can control the acquisition, digitization, and routing of the detection data from the detectors. In one implementation, the DAS 276 controls the movement of the bed 216. The processor 270 performs functions including reconstructing images from the detection data, pre-reconstruction processing of the detection data, and post-reconstruction processing of the image data, as discussed herein.

The processor 270 can be configured to perform various steps of methods 100 and 160 described herein and variations thereof. The processor 270 can include a CPU that can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog, or any other hardware description language and the code may be stored in an electronic memory directly within the FPGA or CPLD, or as a separate electronic memory. Further, the memory may be non-volatile, such as ROM, EPROM, EEPROM or FLASH memory. The memory can also be volatile, such as static or dynamic RAM, and a processor, such as a microcontroller or microprocessor, may be provided to manage the electronic memory as well as the interaction between the FPGA or CPLD and the memory.

Alternatively, the CPU in the processor 270 can execute a computer program including a set of computer-readable instructions that perform various steps of methods 100 and 160, the program being stored in any of the above-described non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xeon processor from Intel of America or an Opteron processor from AMD of America and an operating system, such as Microsoft VISTA, UNIX, Solaris, LINUX, Apple, MAC-OS and other operating systems known to those skilled in the art. Further, CPU can be implemented as multiple processors cooperatively working in parallel to perform the instructions.

The memory 278 can be a hard disk drive, CD-ROM drive, DVD drive, FLASH drive, RAM, ROM or any other electronic storage known in the art.

The network controller 274, such as an Intel Ethernet PRO network interface card from Intel Corporation of America, can interface between the various parts of the PET imager. Additionally, the network controller 274 can also interface with an external network. As can be appreciated, the external network can be a public network, such as the Internet, or a private network such as an LAN or WAN network, or any combination thereof and can also include PSTN or ISDN sub-networks. The external network can also be wired, such as an Ethernet network, or can be wireless such as a cellular network including EDGE, 3G and 4G wireless cellular systems. The wireless network can also be WiFi, Bluetooth, or any other wireless form of communication that is known.

Figure 4A:
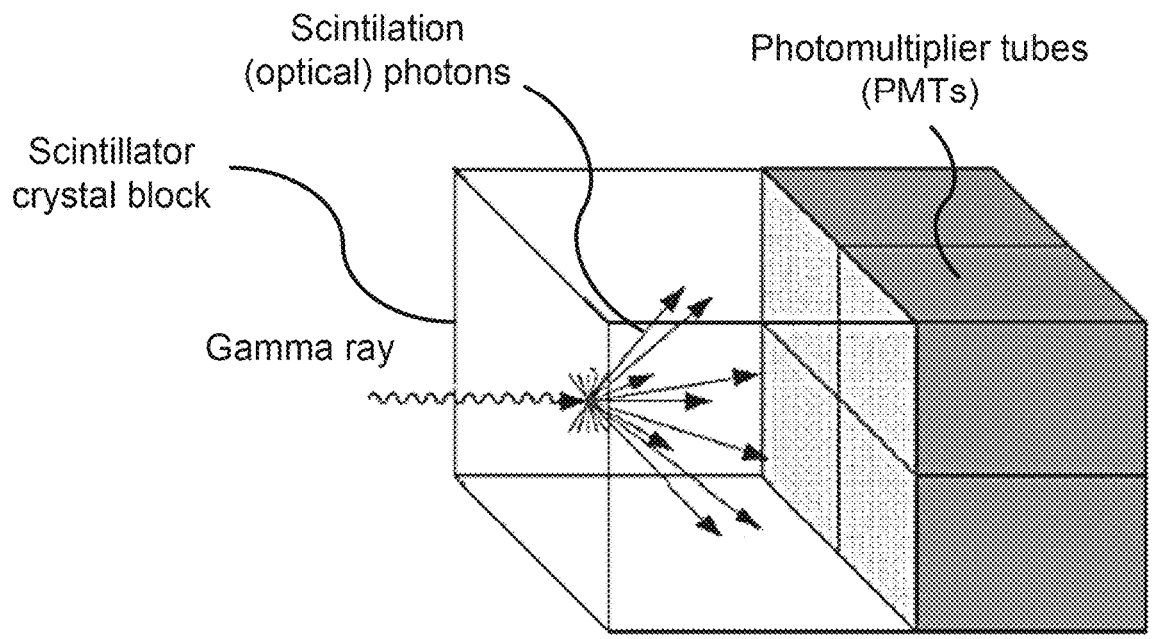
FIG. 4A shows a diagram of a gamma-ray detector module having a single crystal and photomultiplier tubes (PMTs), according to one implementation.
Figure 4B:
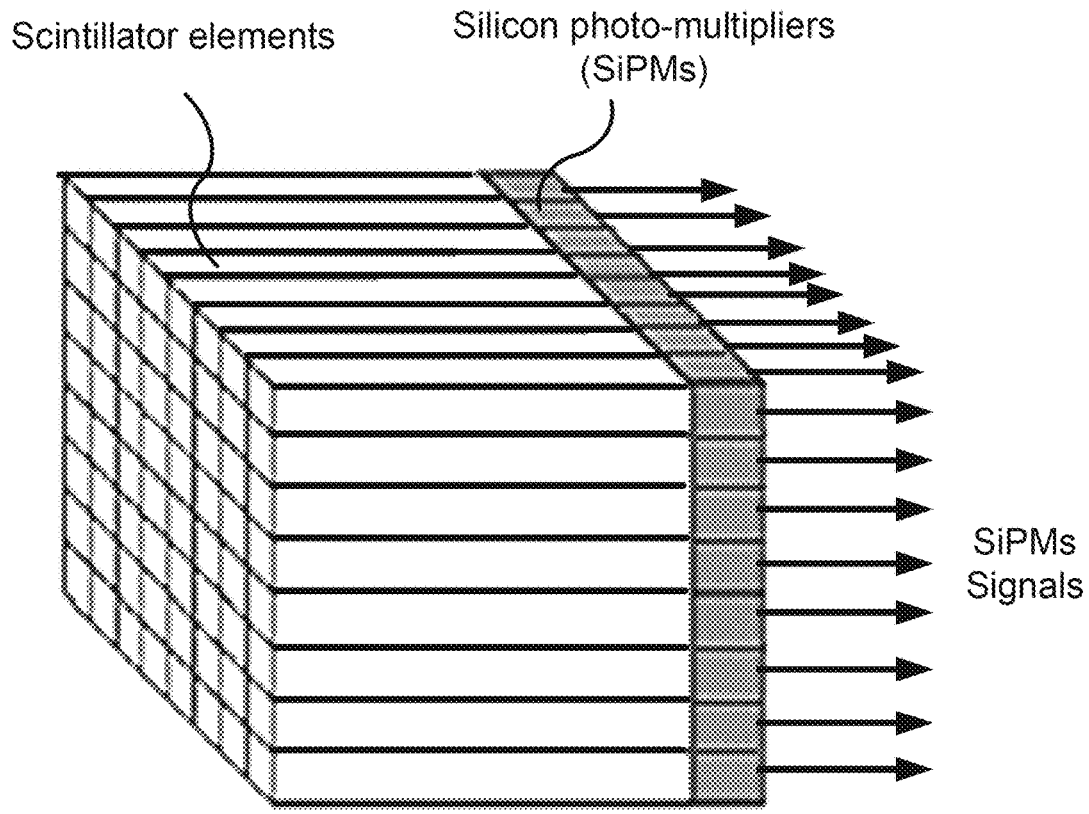
FIG. 4B shows a diagram of a gamma-ray detector module having multiple scintillator crystal elements arranged as an array and using silicon photomultipliers (SiPMs) as photodetectors, according to one implementation.

FIGS. 4A and 4B show several non-limiting implementations of a gamma-ray detector (also referred to as a gamma camera). In FIG. 4A, the scintillator crystal is a single monolithic block, and the location of the scintillation event converting the gamma-ray photon into secondary photons that can be detected by an array of photodetectors, which are illustrated here as photomultiplier tubes (PMTs). The location of the scintillation event can be determined using Anger arithmetic.

In FIG. 4B, the scintillator is cut into a periodic array of separate crystals separated and optically isolated by reflective barriers between the individual elements of the crystal array. This optical isolation between crystals in the block can be imperfect allowing some light sharing between adjacent crystals. FIG. 4B shows the case when silicon photomultipliers (SiPMs) are provided with a one-to-one correspondence between the individual elements of the crystal array and the respective SiPMs. Alternatively, the photodetectors can be photomultiplier tubes PMTs, in which case there is often many more crystal elements than PMTs (i.e., a many-to-few correspondence between crystal elements and photodetectors. When the photodetectors are PMTs, the light sharing between adjacent crystals can be small compared to light sharing that occurs after exiting the crystals, in which case, scintillation events can be distinguished between individual elements of the array using Anger arithmetic to approximately determine locations and then using a flood-map calibration to generate a lookup table mapping the approximate locations calculated using Anger arithmetic to respective indices of the crystal array.

In FIG. 4B, the light from each crystal element is detected by a respective SiPM. With each crystal having its own photodetector, the light sharing among photodetectors can be reduced. Further, each crystal having its own photodetector can result in enhanced resolution by enabling discrimination between simultaneous scintillation events occurring at different crystals within a single detection module (e.g., discriminating Compton scattering among adjacent crystals).

Figure 5:
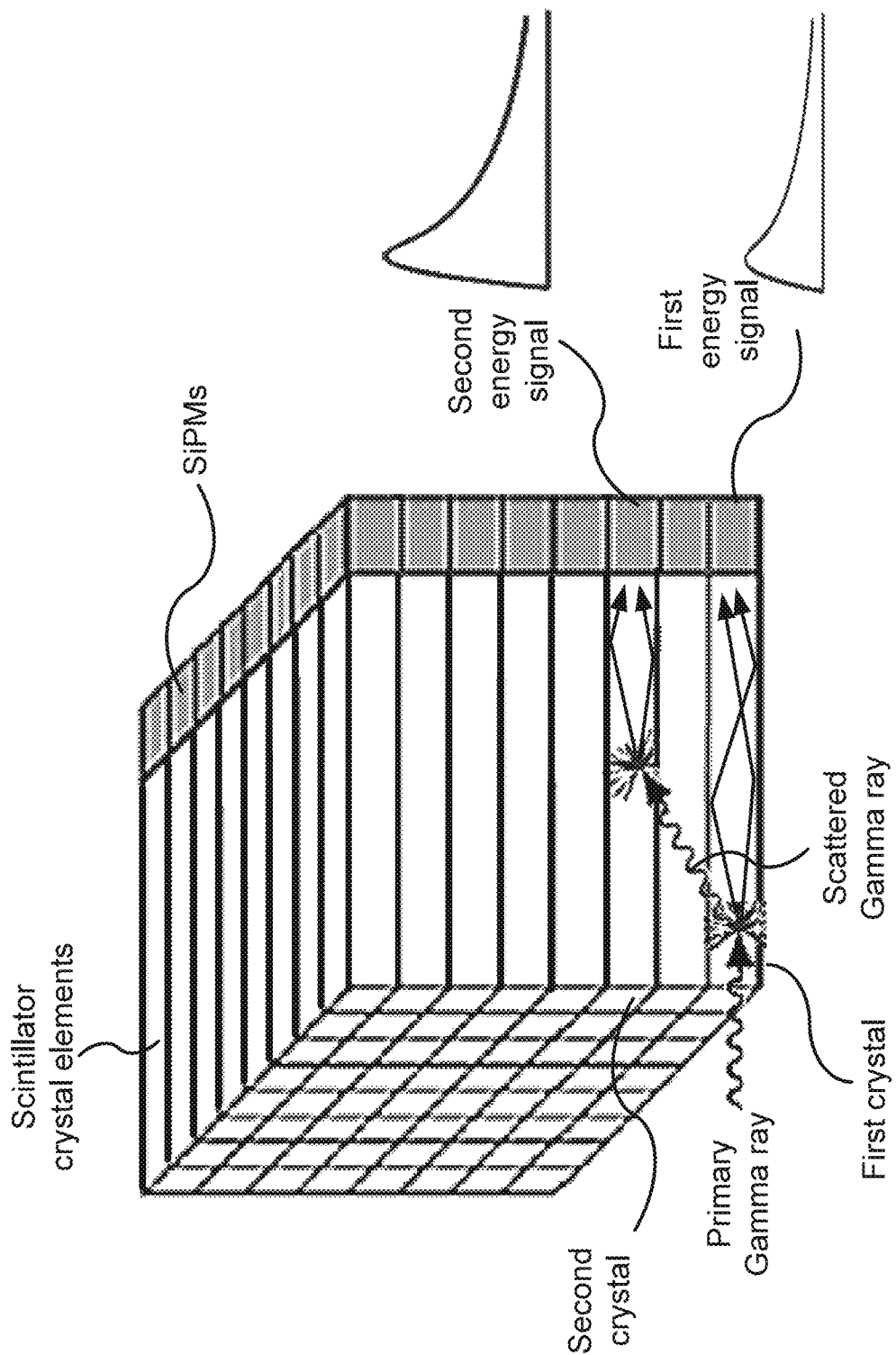
FIG. 5 shows an example of Compton scattering resulting in two energy signals from a single primary gamma ray, according to certain aspects of the present disclosure.

FIG. 5 shows a non-limiting example of an incident gamma ray undergoing Compton scatter in a first crystal resulting in the remaining energy being deposited in a second crystal. The first and second crystals then respectively produce secondary photons via photoelectric absorption resulting in the corresponding SiPMs generating the first and second energy signals. The scatter angle is small, and the energy in the first energy signal is less than the energy in the second energy signal. Even if the shapes of the first and second pulses are the same and differ on their magnitudes, the two signals can be registered as occurring at different times due to a time-walk offset that arises when the arrival time is based on when the rising edge of the pulse exceeds a predetermined value, as illustrated in FIG. 5.

Figure 6A:
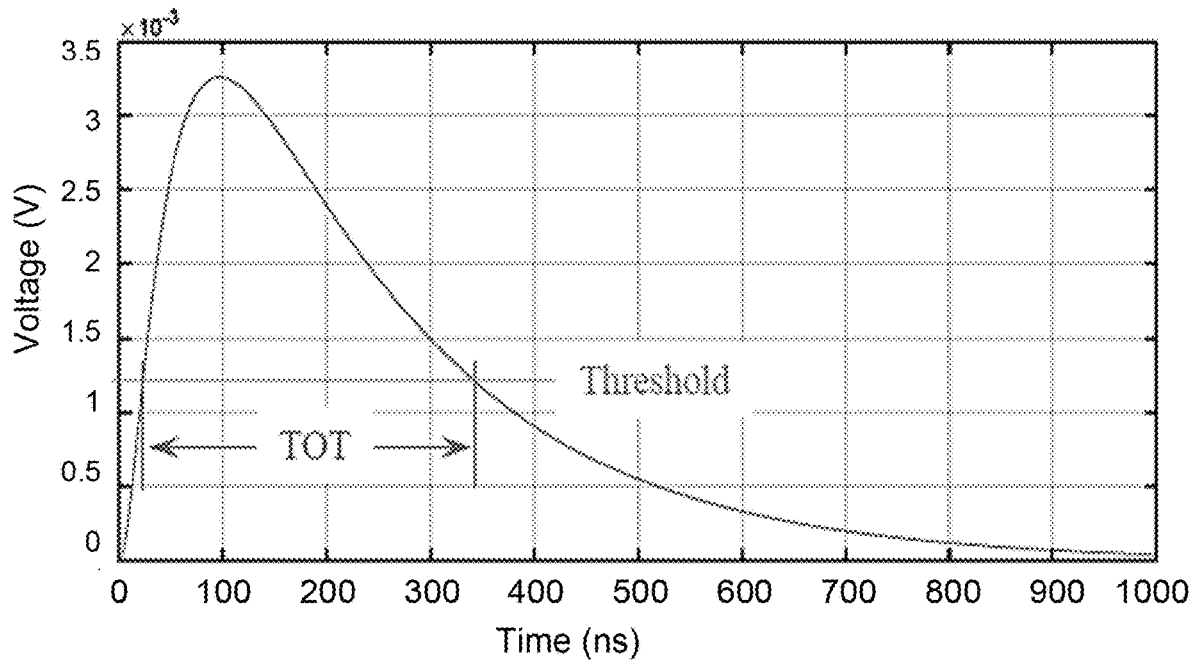
FIG. 6A shows a plot of a time-over-threshold (TOT) measurement, according to one implementation.
Figure 6B:
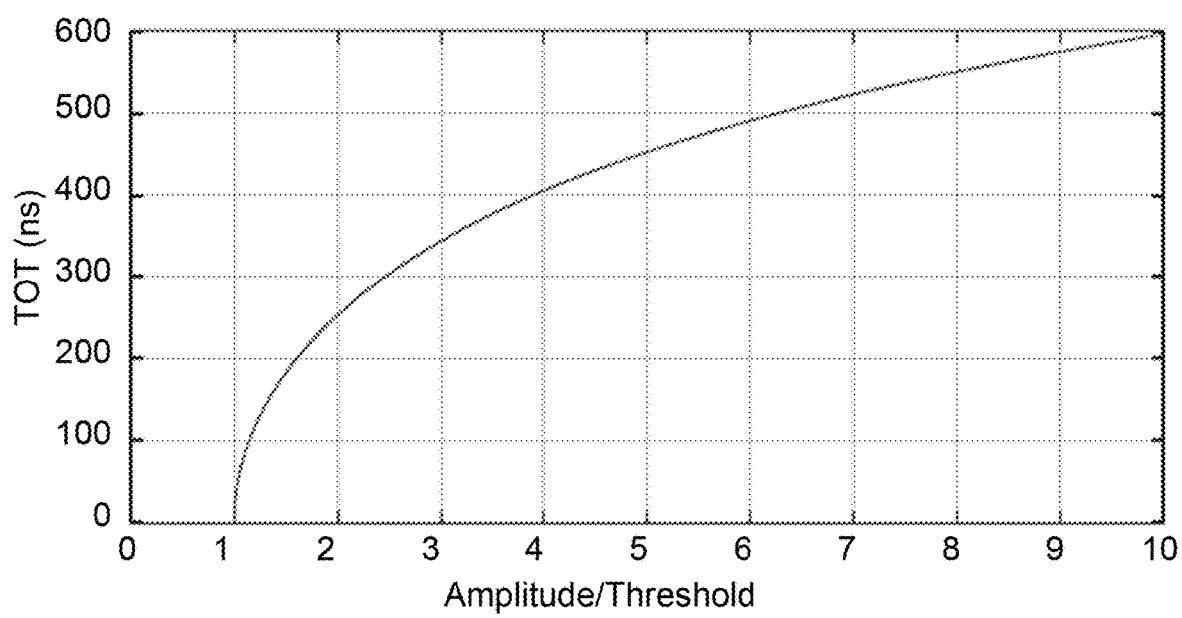
FIG. 6B shows, for a given pulse shape, a plot of the TOT as a function of the ratio peak height to the threshold, according to one implementation.

Returning to non-limiting examples of how to implement the energy calibration at step 180, FIGS. 6A and 6B show plots for a TOT nonlinearity correction, which can be calibrated in step 180 and applied in step 140. FIG. 6A plots, as a function of time, the voltage of a pulse from the detection of a gamma ray. Further, FIG. 6A shows a predefined threshold at about 1.2 millivolts, and the duration of time that the pulse exceeds this threshold is the TOT value. As illustrated in FIG. 6B, the TOT value is monotonically related to the energy of the detected gamma ray, which can be represented by the area under the curve of the pulse, or by the amplitude of the pulse, when the pulse shape remains undistorted by changes in the pulse magnitude. For signals below the threshold no hit is registered.

A function modeling the plot in FIG. 6B can be generated in step 180 from the calibration data using one of many methods. For example, using only the single-channel events, different energy sources with known energy values for the gamma rays can be used to determine the TOT value corresponding to different energy values, and a function (e.g., a shifted square root) can be curve fit to these points. Also, the empirically measured data can be supplemented at lower gamma-ray energies using the detections of scattered gamma rays from Compton scattering, which have energies less than the incident/initial gamma ray. The energies of the Compton scattering detections can be determined based on the area under the curve or the amplitude of the pulse. This calibration can be performed once and stored in memory, and then be recalled from memory when a PET scan is being performed or processed. The described method of calibration is a non-limiting example, and other methods of calibrating the mapping from TOT values to energies can be used without departing from the spirit of the methods and apparatuses described herein.

The Time-over-Threshold (TOT) method estimates the amplitude of a signal by measuring the total time of a signal over given threshold. The measured time is then translated back to amplitude through a non-linear conversion (e.g., the mapping function shown in FIG. 6B). Due to the presence of a threshold, any amplitude blow the threshold will be reported as zero (i.e., no hit).

Figure 7:
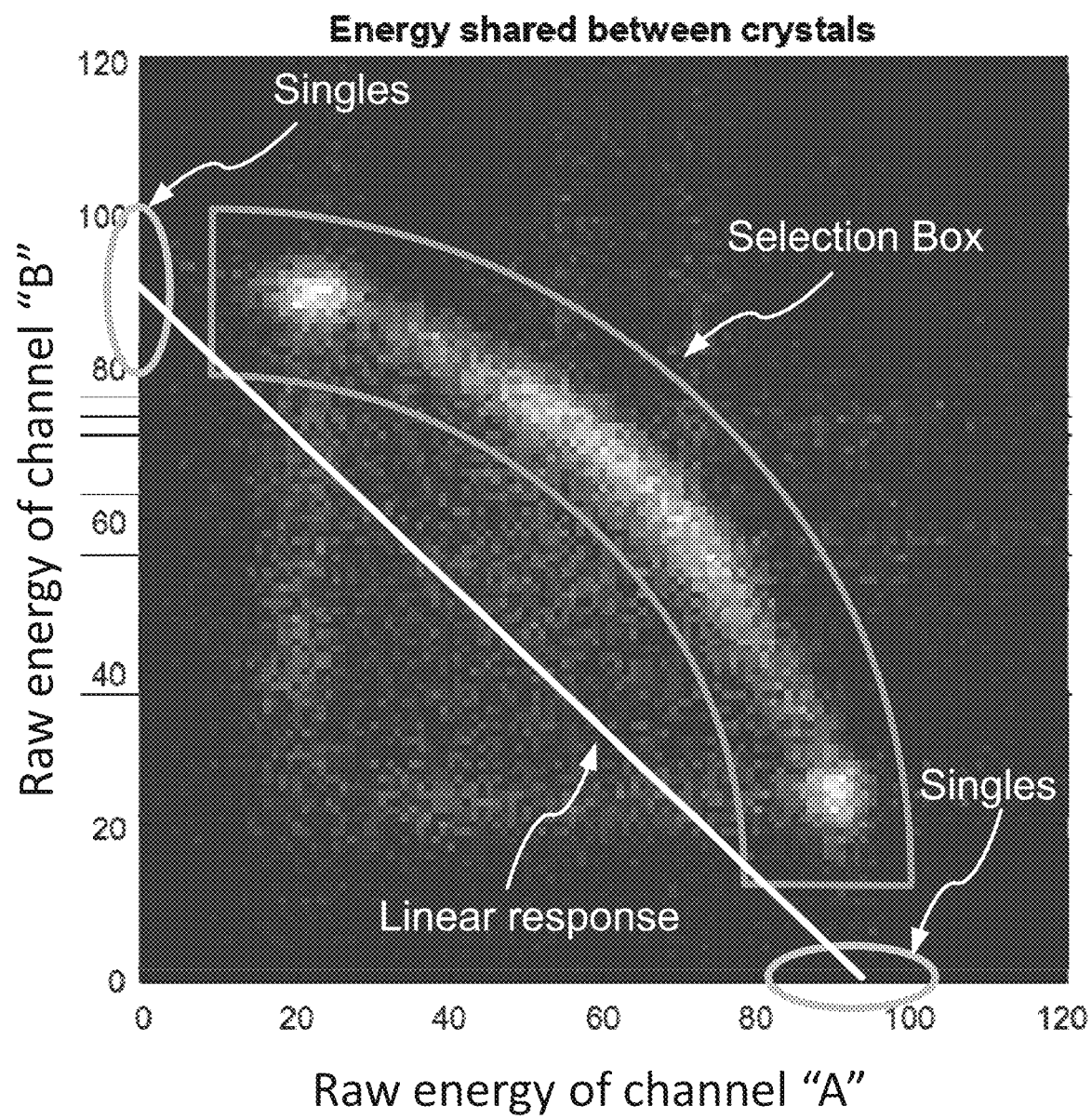
FIG. 7 shows a histogram of the two-channel counts as a function of the measured energy signals for channel "A" and channel "B," according to one implementation.

When multi-channel detection occurs and the TOT technique is applied to measure the energy, a histogram plot can be generated of the detection energies between two crystal elements (e.g., channel "A" and channel "B"), as shown in FIG. 7. For example, the two crystal elements (e.g., channels "A" and B") can be adjacent elements, or they can be non-adjacent elements, as shown in FIG. 5. If the detector response were linear, the histogram values would cluster in a peak along the line indicating a linear response. However, the detector response is nonlinear resulting in the curved shape for the histogram values shown in FIG. 7.

Given that for a given gamma-ray source the gamma-ray energy is known and that the sum of energies from a multi-channel detection must equal this known gamma-ray energy, the values indicated on the histogram can be used to calibrate the energy response of the detectors. As discussed above, the detector response can be calibrated by solving for the parameters of a functional form E=f(TOT) to minimize an error function (i.e., generate a best curve fit).

Now a non-limiting example is provided of how to perform this parameterization of the functional form using the multi-channel counts in FIG. 7. FIG. 7 shows two-channel detection events, but as discussed below, this method also applies to higher-order multi-channel detection. One example of a functional form for the energy calibration by channel parameterization is $$E = f(x, \vec{p} = \{\alpha, \beta, \gamma\}) = \alpha\left(\beta + e^{\frac{x}{\gamma}}\right).$$

Using this or another parameterization, the energy calibration can be expressed by the mapping $f(x|\vec{p})$. In certain implementations, a separate parameterization $\vec{p}$ can be used for each readout channel. That is, each readout channel has its own set of parameters $\vec{p}_i$ to be calibrated (e.g., for the $i^{th}$ channel the energy can be determined using $E(x_i) = f(x_i|\vec{p}_i)$). Due to energy sharing in multi-channel detection, the energy calibration can be performed using fractional energies of the incident energy. Thus, the the entire energy range of interest can be spanned using a single-energy gamma source (e.g., 511 keV or larger) to irradiate the detector. To be effective, the single-energy gamma source should also produce a sufficiently high flux rate to generate a statistically relevant data set within a reasonable time.

To cover a continuous energy range, multi-channel detection events can be discerned and selected (i.e., multi-channel detection events are detection events which have energy shared by two or more channels). As shown in FIG. 7, for two-channel events (i.e., channel "A" and channel "B") a two-dimensional (2D) histogram of the energy correlation between channels can be derived. In general, although small deviations can exist between respective detector channels, the relevant counts for each of the detector channels can lie within approximately the same region, which is shown as the selection box in FIG. 7. Events occurring outside of the selection box (also referred to as selection region) can be omitted from the multi-channel portion of the energy-calibration analysis.

The ovals labelled "Singles" show the regions in which single-channel detection events would cluster for the respective channels. Because the non-limiting example shown in FIG. 7 applies a lower energy threshold below which no count is recorded, there are no events shown in the "Singles" regions of FIG. 7 (i.e., FIG. 7 only shows the two-channel events). However, the energy calibration can include single-channel events in addition to the two-channel events in order to achieve full energy coverage. In certain implementations, single-channel events can occur more frequently than multi-channel events. Thus, to avoid over-representing single-channel events in the energy calibration, an unbiased subset of the single-channel data may be randomly selected to balance the statistical distribution of data represented across the energy range of the detectors.

For three or more channel events, the same general concepts apply, and the methods described herein extend to higher-order multi-channel detection events. For example, the total absorption events can be selected using a selection region applied to a histogram in multi-dimensional space.

To determine the parameters $\vec{p}_a$ and $\vec{p}_b$ for channels "A" and "B," an error function (also referred to as an objective function or a cost function) can be defined, and the parameters $\vec{p}_a$ and $\vec{p}_b$ selected to minimize the error function. For example, when the error function is a chi-squared error function, $$\chi^2 = \sum \frac{(f(x_a, \vec{p}_a) + f(x_b, \vec{p}_b) - E_\gamma)^2}{\sigma(x_a)^2 + \sigma(x_b)^2},$$

the parameters $\vec{p}_a$ and $\vec{p}_b$ are adjusted until the deviation of the total energy of the selected events to incident photon's energy is minimized. Here, $f(x_i, \vec{p}_i)$ with i=a or b is the calculated energy for measured energy signal $x_i$ when the parameters are $\vec{p}_i$ (i.e., the calculated total energy of a selected event is $f(x_a, \vec{p}_a)+f(x_b, \vec{p}_b)$), and the energy of the incident gamma ray is $E_\gamma$. Further, $\sigma(x_i)$ with i=a or b is the variance.

Figure 8:
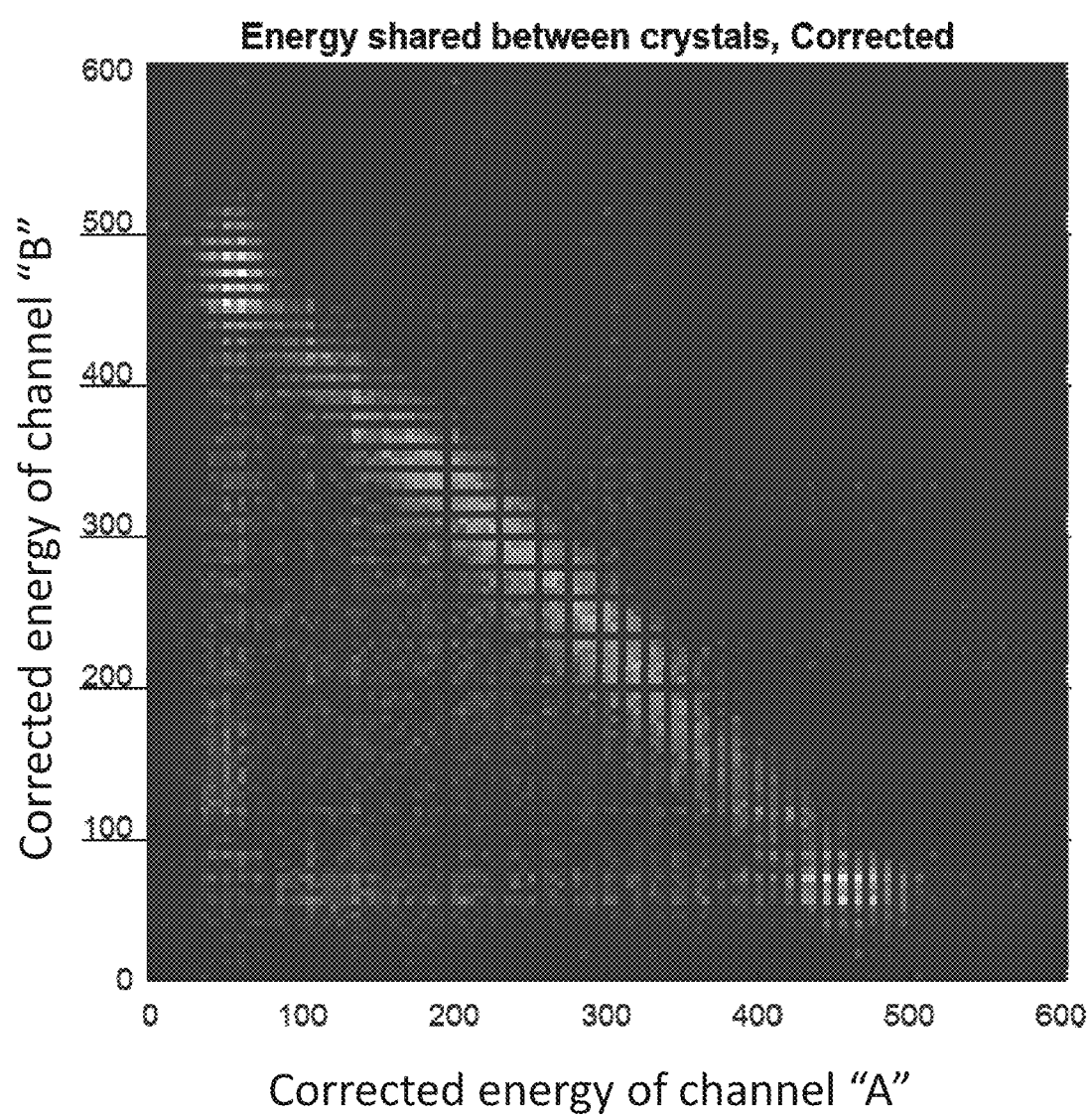
FIG. 8 shows a histogram for corrected energy values, according to one implementation.

FIG. 8 shows a histogram of the corrected energy values after the parameters have been determined by performing a minimization search on the error function. In this case the single-energy gamma-ray source used gamma rays having an energy of 511 keV. The histogram values cluster on the line running from the point (0,511 eV) to the point (511 eV, 0), as expected.

Figure 9:
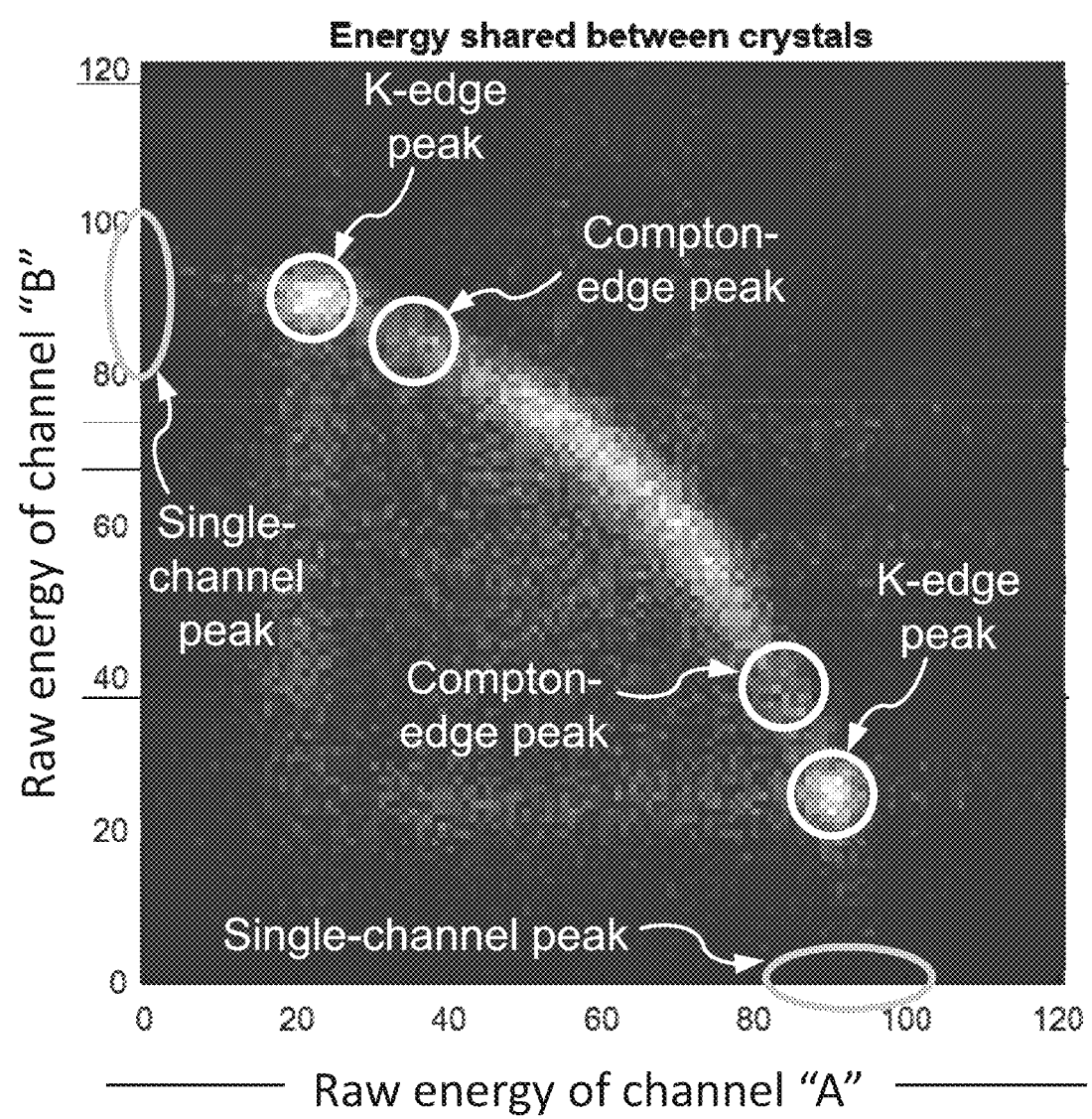
FIG. 9 shows regions corresponding to characteristics energies superimposed on the histogram of FIG. 7, according to one implementation

The method described above by applying special weights to the data lying within special/characteristic regions on the histogram. Events with characteristic energies (e.g. events corresponding to the Compton edge/backscattering peaks, the K-edge/escape peaks, or the total absorption/single-channel peaks) are indicated by respective circles in FIG. 9. Data located within these special/characteristic regions the histogram can be tagged and used as additional calibration points. For example, these events can be used as single channel tagged events with known energy. In this case, the error function can be defined as $$\chi^2 = c \sum_{non-tagged} \frac{(E(x_a, \vec{p}_a) + E(x_b, \vec{p}_b) - E_\gamma)^2}{\sigma(x_a)^2 + \sigma(x_b)^2} + (1-c) \sum_{tagged} \frac{(E(x_i, \vec{p}_i) - E_i)^2}{\sigma(x_i)^2},$$

wherein $E_i$ is the known characteristic energy of the tagged events, and c is a constant that balances the relative contributions between the non-tagged (e.g., the multi-channels events) and the tagged (e.g., the characteristic energy events). In the above example, all of the characteristic energy events are combined and weighted equally. Alternatively, the K-edge peak events can be weighted differently from the Compton peak events, which can in turn be weighted differently from the total-absorption/no-energy-sharing events. Additionally, the relative weighting can also be achieved through the relative number of events of each type contributing to the calibration data 165.

So far, the non-limiting examples have considered the case when separate parameters $\vec{p}_i$ are used for the calibration of each of the respective channels. Alternatively, a single set of parameters $\vec{p}_t$ can be used for multiple channels. For example, all of the channels within a detector module might have approximately equal nonlinear responses, enabling a single parameterization for all of the channels in the module. Similarly, the detector response for all channels within a PET scanner might be fit using a single parameterization. In which case, the above error functions would be summed over the data accumulated the multiple channels that are being calibrated together using a single parameterization.

The energy-calibration methods described herein, which use single-gamma-ray source, have several advantages over related energy-calibration methods, which use only single-channel events and require multiple sources corresponding to different gamma-ray energies. First, the methods described herein cost less because only one source is needed. Second, the methods described herein save time because the can be performed more quickly and simply in a single iteration, rather than repeated iterations with different sources. Third, the methods described herein enable continuous energy coverage over an entire range of energy values, rather than being restricted to those discrete energies at which gamma-ray sources exist.

According to certain implementations, the method described herein calibrates the energy response of pixelated gamma detectors using only a single energy source, the method comprising. This method can be performed by (i) selecting a functional form to parameterize the energy response of the gamma detector, (ii) collecting calibration data using a single energy source, (iii) adjusting the parameters of individual channels to minimize the deviation of summed energy from the incident gamma's energy.

In certain implementations, the method can be extended to include that the parameterization of energy response only needs to be done with a representative channel. Sometimes, and the energy calibration process can be repeated and/or verified with multiple energy sources. The parameterization extracted using the representative channel can then be commonly applied for all other channels of the same type of detectors.

The the method can be performed using single gamma-ray source that produces gamma rays having energies greater than or equal to the energy of gamma rays used by the scanner (e.g., the energy of gamma rays produced during positron annihilation, when the scanner is a PET scanner). That is, the single gamma-ray source that produces gamma rays having an energy large enough that multi-channel detection events correspond to energies covering the entire energy range of interests. Further, the single gamma-ray source produces a gamma-ray beam such that the whole active area of the detector is irradiated/covered within the beam angle to a predetermined flux rate in order to generate the desired level of statistics within a predetermined time duration.

In certain implementations, the coincidence between channels with a predetermined time window is used to select multi-channel events in order to discriminate multi-channel events from randoms and scatter.

In certain implementations, the total absorption events involving multiple channels are selected within a multi-dimensional histogram space (e.g., each dimension corresponds to a respective channel). For example, a channel can have four adjacent channels with which it shares energy. When energy sharing occurs due to imperfect optical isolation between channels, energy sharing can occur simultaneously with all adjacent channels that share a side with the primary channel, resulting in a five dimensional space to determine the selection regions, for example. Also, due to the nature of energy sharing (e.g., Compton scattering), the channels with which energy is shared might not necessarily adjacent.

In certain implementations, single-channel total absorption events may be added to the calibration data set either as multi-channel events with extreme energy sharing (100% to 0) or as single-channel tagged events.

In certain implementations, singles events with characteristic energies (e.g. events in the Compton edge/backscattering peak and the K-edge/escape peaks) can be used as single events in the error function regardless of whether they are in coincidence with other events. These characteristics events can be added to the data set as single-channel tagged events, as multi-channel events, or as both.

In certain implementations, the deviation of the summed energy of selected total absorption events from the incident photon's energy can be represented as an error function, e.g., the chi-squared error function used for illustrative purposes above. When single-channel tagged events are added, an additional term is introduced in the error function. In addition to the chi-squared error function, other choices of error functions can be used.

In certain implementations, the calibration can be done on a group-by-group basis, in which each group is a combination of more than one channel (e.g., a detector module). In this case, each channel will obtain several sets of calibration parameters as it can form coincidence with a few different channels. Averaging (possibly weighted) over the calibration data corresponding to the group is used to determine the final set of the parameters $\vec{p}_i$ for the channels within the group. Using statistics (e.g., the channel-by-channel variances) as weights in the averaging can produce good results for the parameters $\vec{p}_i$.

In certain implementations, to avoid averaging and also ultimately use all statistics, an alternative is to combine all data from the whole detector and minimize the total deviation by adjusting all channel's calibration parameters. The total deviation can be a sum of all chi-squares. A high efficient minimization algorithm is needed for best performance.

In certain implementations, if data from multiple energy sources are available, they can be combined together into a single error function that is then optimized to determine the parameters $\vec{p}_i$.

In certain implementations, method 160 is performed periodically to maintain the energy calibration and account for aging or other changes in the response of the detector channels. When one or more of the parameters in $\vec{p}_i$ is stable and does not change over time (e.g., the change of the parameter between two or more calibrations is less than a predetermined amount/fraction of the parameter value), these stable parameters can be fixed during subsequent iterations of the energy calibration, thereby accelerating the calibration process.

In certain implementations, a quality/sanity check can be performed to verify whether nonlinearity correction (i.e., the energy calibration) is within predetermined specification. This quality check can be performed to verify that energy calibration calculated in step 180 is reasonable/consistent with expectations, or can be performed to determine if aging/changes to the detector channels require calibration maintenance performing method 160 to update the energy calibration 185. For example, the difference between the summed energies multi-channel events from the known energy of incident gamma rays (e.g., 511 keV) and/or the difference between the energies of selected single-channel events (i.e., total-absorption events) from the known energy of incident gamma rays can be used to check/verify whether nonlinearity correction is valid. This verification can be performed during maintenance calibration and/or as a routine quality check.

While certain implementations have been described, these implementations have been presented by way of example only, and are not intended to limit the teachings of this disclosure. Indeed, the novel methods, apparatuses and systems described herein may be embodied in a variety of other forms; furthermore, various omissions, substitutions and changes in the form of the methods, apparatuses and systems described herein may be made without departing from the spirit of this disclosure.

The invention claimed is:

1. A gamma-ray emission imaging apparatus, comprising: processing circuitry configured to
obtain calibration data representing times and energies of gamma rays incident at a plurality of detector channels, the gamma rays being irradiated from a single calibration source only,
determine multi-channel detection events in which energy from a respective gamma ray is shared and then detected by more than one channel of the plurality of detector channels, and
parameterize an energy response of a first channel by adjusting respective parameters of a parameterized mapping for the first channel to minimize an error function representing a difference between a known energy of gamma rays that are irradiated from the single calibration source and calibrated energies generated from the multi-channel detection events of the calibration data, to generate an energy calibration, wherein
the parameterized mapping relates detected energy values at one or more channels of the plurality of detector channels to actual energies of the gamma rays.

2. The apparatus according to claim 1, wherein the processing circuitry is further configured to obtain the calibration data, wherein the calibration data are acquired from the single calibration source, and the single calibration source includes no more than one radioactive isotope emitting the gamma rays predominantly at a single gamma-ray energy.

3. The apparatus according to claim 1, wherein the processing circuitry is further configured to generate the calibrated energies by calculating, for each of the multi-channel detection events corresponding to the first channel, a sum of calibrated energy values of detector channels corresponding to the each multi-channel detection event, the calibrated energy values being generated by applying detected energy values of the calibration data to the parameterized mapping from.

4. The apparatus according to claim 1, wherein the processing circuitry is further configured to
apply the energy calibration to correct measured energy values of emission data that is acquired during a gamma-ray emission scan using the plurality of detector channels, thereby generating energy-corrected emission data, and
reconstruct an image using the energy-corrected emission data.

5. The apparatus according to claim 4, wherein the processing circuitry is further configured to obtain calibration data of the gamma rays being irradiated from the single calibration source, wherein the gamma rays being irradiated from the single calibration source have an energy greater than or equal to an energy of gamma rays being irradiated during the gamma-ray emission scan to acquire the emission data.

6. The apparatus according to claim 4, wherein the processing circuitry is further configured to apply the energy calibration to correct the measured energy values of the emission data by applying the adjusted parameters of first channel to correct the measured energy values corresponding to the first channel and to correct the measured energy values corresponding to other channels that are in a same group as the first channel.

7. The apparatus according to claim 1, wherein the processing circuitry is further configured to
obtain the calibration data, wherein the calibration data represents times and positions at which the gamma rays are detected in addition to representing the energies of the gamma rays, and
determine multi-channel detection events by determining that two or more detection events correspond to a given multi-channel detection when the two or more detection events occur within a predetermined time window, are located within a predetermined spatial proximity, and/or have energies summing to a value within a predefined energy window.

8. The apparatus according to claim 1, wherein the processing circuitry is further configured to parameterize the energy response, wherein
the multi-channel detection events determined for the first channel include energy-sharing events with a plurality of other channels of the plurality of detector channels, including adjacent channels to the first channel and/or non-adjacent channels to the first channel, and
for the first channel, the calculating of the sum of energy values of the detector channels omits multi-channel detection events that are outside of a selection region within a multi-dimensional energy space defined by the first channel and the plurality of other channels.

9. The apparatus according to claim 1, wherein the processing circuitry is further configured to parameterize an energy response of the first channel, wherein
the error function includes a multi-channel term and a singles term,
the multi-channel term includes a difference between the known energy of the gamma rays from the single calibration source and the respective sums of energy values for the first channel, and
the singles term includes a difference between one or more characteristic energies of the gamma rays and characteristic measured values corresponding to characteristic events, the characteristic measured values being obtained by the parameterized mapping from the calibration data, and the characteristic events corresponding to total-absorption events, a k-edge escape peak, and/or a Compton-scatter peak.

10. The apparatus according to claim 1, wherein the processing circuitry is further configured to parameterize the energy response of the first channel, wherein the error function is a chi-squared error function.

11. The apparatus according to claim 1, wherein the processing circuitry is further configured to parameterize the energy response of the first channel together with a group that includes other channels of the plurality of detector channels in addition to the first channel, the parameterizing of the energy response of the group being performed by adjusting respective parameters of the parameterized mapping for the group to minimize the value of the error function, the error function being based on multi-channel and single-channel events of two or more channels of the group.

12. The apparatus according to claim 11, wherein the processing circuitry is further configured to parameterize the energy response of the group, wherein contributions to the error function from respective channels of the group are weighted according to respective statistics of the multi-channel detection events of the corresponding channels of the group.

13. The apparatus according to claim 11, wherein the processing circuitry is further configured to parameterize the energy response of the group, wherein the group includes all channels of the plurality of detector channels.

14. The apparatus according to claim 11, wherein the processing circuitry is further configured to parameterize an energy response of a second channel together with another group that includes other channels of the plurality of detector channels in addition to the second channel, the parameterizing of the energy response of the group being performed by adjusting respective parameters of a parameterized mapping for the another group to minimize a value of the error function, the error function being based on multi-channel and single-channel events of two or more channels of the another group,
the group of channels includes channels adjacent to the first channel, and the another group of channels includes channels adjacent to the second channel, and
when a third channel is a member of the group and the another group, respective parameters of the parameterized mapping applied for the third channel correspond to an average with respect groups of which the third channel is a member.

15. The apparatus according to claim 1, wherein the processing circuitry is further configured to
repeat an energy calibration for another calibration data by performing again (i) the determining multi-channel detection events, (ii) calculating the sum of energy values, and (iii) parameterizing the energy response of the first channel, except using the another calibration data rather than the calibration data, and
the repeating of the energy calibration is performed periodical to update the parameters of the parameterized mapping.

16. The apparatus according to claim 15, wherein the processing circuitry is further configured to
determine stable parameters of the parameterized mapping based on the stable parameters changing less than a predetermined amount between iterations of repeating the energy calibration, and during parameterizing the energy response, maintaining the stable parameters while other parameters of the parameterized mapping are adjusted to minimize the error function.

17. The apparatus according to claim 15, wherein the processing circuitry is further configured to verify that the parameterized mapping is within predetermined specification by performing a quality check using quality-check emission data, and perform the quality check by determining whether a first predefined percentage of the parameterized mapping applied to single-channel events of the quality-check emission data statistically fall within a first predefined energy range, and/or a whether a second predefined percentage of a sum of the parameterized mapping applied to multi-channel events of the quality-check emission data statistically fall within a second predefined energy range, and the quality-check emission data is one of the calibration data, the other calibration data, and/or the emission data.

18. The apparatus according to claim 1, wherein the processing circuitry is further configured to use second-source calibration data from a second calibration source together with the obtained calibration data from the single calibration source to generate the error function as a multi-source error function, and parameterize the energy response of the first channel by adjusting the respective parameters of the parameterized mapping for the first channel to minimize the multi-source error function.

19. A positron emission imaging method, comprising:

obtaining calibration data representing times and energies of gamma rays incident at a plurality of detector channels, the gamma rays being irradiated from a single calibration source only;

determining multi-channel detection events in which energy from a respective gamma ray is shared and then detected by more than one channel of the plurality of detector channels; and parameterizing an energy response of a first channel by adjusting a respective parameters of a parameterized mapping for the first channel to minimize an error function representing a difference between a known energy of gamma rays that are irradiated from the single calibration source and calibrated energies generated from the multi-channel detection events of the calibration data, to generate an energy calibration, wherein the parameterized mapping relates detected energy values at one or more channels of the plurality of detector channels to actual energies of the gamma rays.

20. A non-transitory computer readable storage medium including executable instructions, wherein the instructions, when executed by circuitry, cause the circuitry to perform the method according to claim 19.

* * * * *